Figure 1:
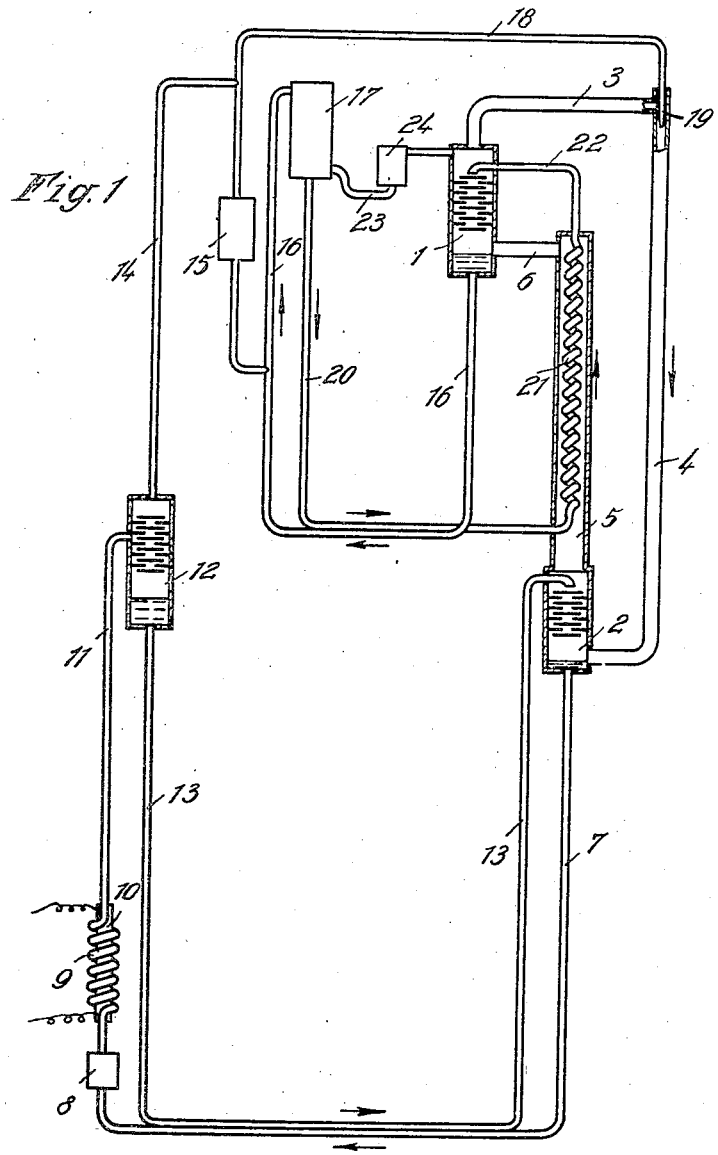

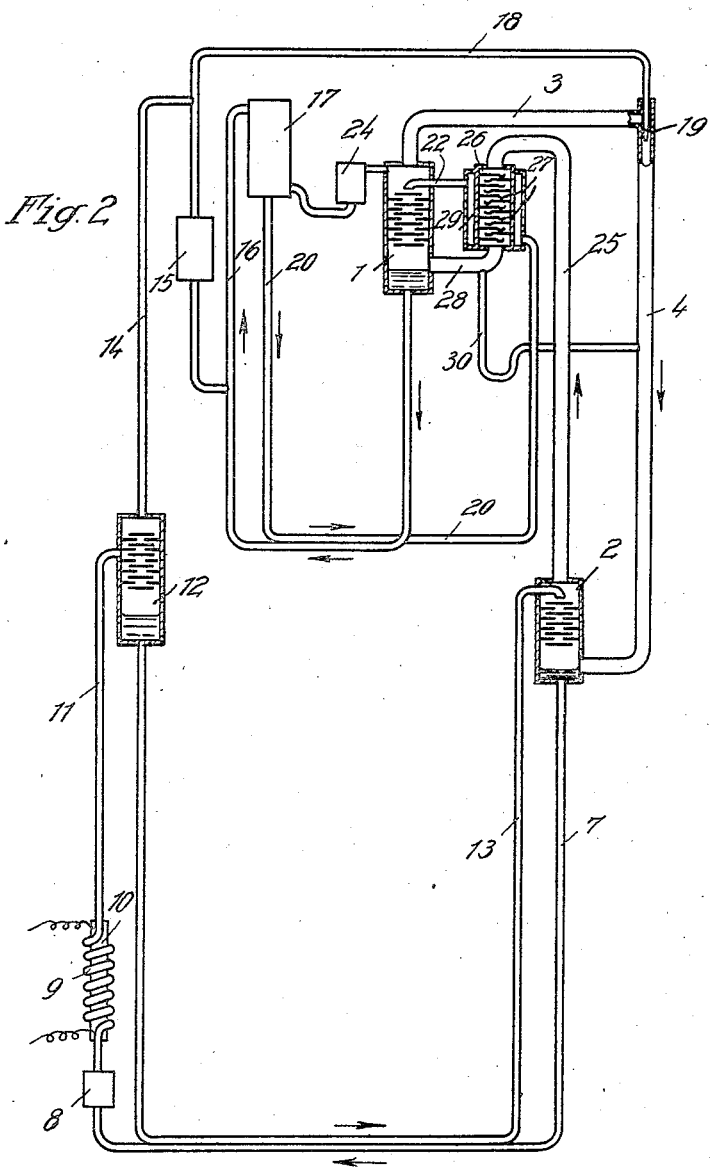

Patented Mar. 14, 1933

1,901,794

UNITED STATES PATENT OFFICE

EDMUND ALTENKIRCH, OF NEUENHAGEN NEAR BERLIN, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ABSORPTION REFRIGERATING MACHINE

Application filed January 18, 1929, Serial No. 333,376, and in Germany January 26, 1928.

My invention relates to improvements in absorption refrigerating machines, and more particularly to the known type in which the working medium evaporates out of an absorption solution into an admixed inert gas.

In these machines the gas mixture coming from the absorber has approximately the temperature of the cooling water leaving the absorber, or in the case of air cooling the temperature of the air heated by the absorption process; the gas mixture is thus to a considerable extent loaded with steam originating from the solvent of the absorption liquid. If the wet gas mixture now passes directly into the evaporator, a portion of the low temperature existing here must first be used to condense the steam. This process means a loss of valuable low temperature, because it takes place in that part of the machine where this low temperature is to be utilized.

It might suggest itself to eliminate this drawback by effecting an exchange of heat between the rich dry gas coming from the evaporator and the poor wet gas coming from the absorber and having a much higher temperature. This would, however, not bring about a substantial improvement, inasmuch as the cold dry gas demands comparatively large heat exchange surfaces on account of its low heat conductivity. This disadvantage becomes particularly prominent, if large quantities of gas mixtures have to be dealt with for the purpose of producing an intensive refrigeration, that is at the time when it is most badly wanted.

In such absorption machines, in which the working medium evaporates out of an absorption solution directly into the admixed inert gas, my invention shows another and far better way to precool and dry the warm gas mixture coming from the absorber. This way consists in bringing this gas mixture prior to its entry into the evaporator into heat interchange with the comparatively cold rich absorption solution coming from the reabsorber. This solution may be more strongly cooled, than the gas mixture coming from the absorber, particularly when air cooling is applied. Since, on the other hand, the temperatures at which the steam is now condensed lie considerably higher than the evaporator temperature, the precooling takes place in a thermodynamically favorable manner and no refrigeration produced at a low temperature is wasted. The temperature rise, which the rich solution undergoes owing to the heat interchange with the gas mixture may appear a drawback, but, on the other hand, the gas is more easily expelled from this solution just because its temperature has been raised. The production of low temperatures by the evaporator is naturally the greater the cooler and drier the gas mixture is entering it.

In the drawings affixed hereto and forming part of my specification two embodiments of my invention are illustrated by way of example. Both are based on refrigerating machines operating according to the reabsorption principle and in which the circulation of the gas mixture through the absorber and the evaporator is produced by a jet nozzle.

In the drawings

Fig. 1 shows a diagrammatic representation of one machine, and

Fig. 2, a similar view of a slightly modified machine.

Like parts are indicated by like numerals of reference in both figures of the drawings.

Referring to Fig. 1 of the drawings, the steam jet causing the circulation of the gas mixture enters through a nozzle 19 the pipe 4 leading down to the absorber 2, its upper end being in communication with the evaporator 1 by a pipe 3. The nozzle steam is supplied by a gas pipe 18 fed by the generator or boiler 9. The gas mixture, consisting of ammonia and hydrogen, for instance, entering the lower part of the absorber 2 rises in the absorber and in its upward extension 5 and then returns into the lower part of the evaporator 1 through a pipe 6.

The absorption liquid (for instance a solution of ammonia in water) passes through a pipe 7 and a trap vessel 8 connected in it into the before mentioned boiler 9 consisting of a vertical coil heated by an electric heating rod 10. By means of rising pipe 11 the liquid is conveyed in well known manner into the rectifier chamber 12 by the action of the gas bubbles contained in it. The rectifier is in communication by a pipe 14 with the already mentioned pipe 18, which terminates in the nozzle 19. From the rectifier 12 the impoverished liquid is returned to the absorber 2 by a pipe 13 which in conjunction with the pipe 7 forms a heat interchanging device.

The rich absorption solution necessary for feeding the evaporator 1 flows from the reabsorber 17 into the evaporator through a U-shaped pipe 20, which first forms a heat interchanger with the pipe 16 returning the poor solution coming from the evaporator into the reabsorber 17, then traverses the upward extension 5 of the absorber by way of a cooling coil 21 and finally terminates in a pipe 22 opening into the upper part of the evaporator 1. The conveyance of the liquid is effected in a rising portion of the pipeline 16 by conducting gas on its way from the rectifier 12 to the reabsorber 17 into the pipe 16 through a tank 15, which merely serves to facilitate the starting of the machine.

Between the reabsorber 17 and the evaporator 1 is provided a venting device 23, 24, which acts in such a manner that gas which may not have been absorbed in the reabsorber 17 is able to return into the cycle of the gas mixture.

The gas mixture traversing the extension 5 of the absorber 2 from the bottom to the top is precooled and dried by the rich absorption solution ascending in the cooling coil 21, so that it reaches the evaporator 1 substantially free from water. In this way are avoided the losses in the production of low temperature which otherwise are caused in the evaporator by the condensation of steam.

The watery condensate separated in the absorber extension 5 returns into the absorber 2. Any excess quantities of liquid collecting in the evaporator, which pass through the pipe 6 into the extension 5 are returned into the absorber 2 along the same path.

The machine illustrated in Fig. 2 of the drawings differs from the machine just described by a modification in the arrangement and construction of the vessels for bringing about the heat interchange between the gas mixture and the absorption solution. The gas mixture circulating between th evaporator 1 and the absorber 2 passes in this machine from the absorber through an inverted U pipe 25 into the upper part of a container 26 fitted with baffles, the lower part of which container is connected with the lower part of the evaporator 1 by a pipe 28. Container 26 is enveloped by a jacket 29 which is traversed by the rich absorption solution supplied to the evaporator by the pipes 20 and 22. The gas pipes 28 and 4 are connected with each other by a pipe 30 forming a liquid seal. The pipe 30 serves for returning excess quantities of liquid collecting in container 26 as well as in the evaporator automatically into the absorber. The parts not specially mentioned and marked with the same letters of reference as in Fig. 1 serve the same object as in the first described machine.

The mode of operation of this machine differs from that of the first described machine primarily by the fact, that the heat interchange between the rich absorption solution and the gas mixture takes place on the counterflow principle. The gas mixture entering container 26 through pipe 25 from the top is cooled by the absorption solution traversing the jacket 29 from the bottom to the top and is thus freed from its content of steam. The liquid condensed on the baffles 27 of container 26 passes into the lower part of the evaporator 1 or through the pipes 30 and 4 into the absorber 2.

The drying of the vapor may be carried particularly far if, as is the case in both the described machines a heat interchange takes place also between the rich solution and the very cold poor solution returning from the evaporator, prior to the heat interchange between the rich solution, coming from the reabsorber, and the gas mixture.

It may happen that when the refrigerating machine is shut down some absorption solution passes from the reabsorber 17 into the absorption system and remains there. In this way the quantity of liquid in the reabsorber is temporarily reduced and it takes a comparatively long time until the solution which is lacking returns from the absorber system into the reabsorber. To shorten this time, the liquid separated from the gas mixture in consequence of the heat interchange with the rich absorption solution may first be introduced into the lower part of the evaporator 1 instead of returning it directly into the absorber system. Provisions must be made to permit the excessive liquid to return into the absorber system by providing an overflow in the evaporator, for instance at the height of the level of the liquid indicated. A return into the absorber system can occur now only when the reabsorber system has a sufficient amount of liquid. If the shortage mentioned does not become noticeable, however, the entire quantity of liquid may equally well at once be introduced into the absorber 2 in the manner described before.

It will be understood that for bringing about the circulation of the gas mixture it is not absolutely necessary to introduce a gaseous working medium into the gas circulating system, but that any other suitable medium might be used for the purpose.

In the embodiments of my invention described the absorption solution traverses the evaporator in the direction from the top to the bottom, while the gas mixture is passed through it in the direction from the bottom to the top, i. e. in counterflow to the absorption solution. My invention is, however, equally applicable to such cases, where the absorption solution and the gas mixture traverse the gas expeller together in the direction from the top to the bottom. In this case the liquid condensed from the circulating gas mixture is preferably not passed through the evaporator, but returned into the reabsorber system by by-passing the evaporator, if for the reason stated above it is not preferred to introduce it again into the absorber system.

Various modifications and changes may be made without departing from the spirit and the scope of the invention.

I claim as my invention:

1. In an absorption refrigerating machine, consisting of a boiler, a reabsorber, an evaporator and an absorber, containing an absorption solution and a working medium partly gaseous and partly in a condensed fluid phase, and furthermore containing an inert gas admixed with the gaseous working medium in the evaporator and the absorber, connecting pipes between the absorber and the evaporator, which permit circulation of the mixture of working medium and inert gas, a connecting pipe between the reabsorber and the evaporator for conveying the absorption solution enriched in the reabsorber into the evaporator for the purpose of liberating gaseous working medium from the solution into the admixed inert gas, means for cooling said enriched solution to a temperature lower than that prevailing in the reabsorber during operation and means for effecting a heat interchange between the said rich absorption solution and the mixture of gaseous working medium and inert gas flowing from the absorber into the evaporator.

2. In an absorption refrigerating machine, consisting of a boiler, a reabsorber, an evaporator and an absorber, containing an absorption solution and a working medium partly gaseous and partly in a condensed fluid phase, and furthermore containing an inert gas admixed with the gaseous working medium in the evaporator and the absorber, connecting pipes between the absorber and the evaporator, which permit circulation of the mixture of working medium and inert gas, a connecting pipe between the reabsorber and the evaporator for conveying the absorption solution enriched in the reabsorber into the evaporator for the purpose of liberating gaseous working medium from the solution into the admixed inert gas, means for cooling said enriched solution to a temperature lower than that prevailing in the reabsorber during operation and means for effecting a heat interchange between the said rich absorption solution and the mixture of gaseous working medium and inert gas flowing from the absorber into the evaporator, the pipes being disposed in heat exchanging relation to each other and one being located within the other.

3. In an obsorption refrigerating machine, consisting of a boiler, a reabsorber, an evaporator and an absorber, containing an absorption solution and a working medium partly gaseous and partly in a condensed fluid phase, and furthermore containing an inert gas admixed with the gaseous working medium in the evaporator and the absorber, connecting pipes between the absorber and the evaporator, which permit circulation of the mixture of working medium and inert gas, a connecting pipe between the reabsorber and the evaporator for conveying the absorption solution enriched in the reabsorber into the evaporator for the purpose of liberating gaseous working medium from the solution into the admixed inert gas, means for cooling said enriched solution to a temperature lower than that prevailing in the reabsorber during operation and means for effecting a heat interchange between the said rich absorption solution and the mixture of gaseous working medium and inert gas flowing from the absorber into the evaporator, comprising a heat interchange vessel located in the pipe connection through which the rich absorption solution is conducted into the evaporator and a second vessel traversed by the gas mixture flowing from the absorber to the evaporator, said second vessel being enclosed by said heat interchange vessel.

4. In an absorption refrigerating machine, consisting of a boiler, a reabsorber, an evaporator and an absorber, containing an absorption solution and a working medium partly gaseous and partly in a condensed fluid phase, and furthermore containing an inert gas admixed with the gaseous working medium in the evaporator and the absorber, connecting pipes between absorber and evaporator, which permit circulation of the mixture of working medium and inert gas, a connecting pipe between the reabsorber and the evaporator for conveying the absorption solution enriched in the reabsorber into the evaporator for the purpose of liberating gaseous working medium from the solution into the admixed inert gas, means for cooling said enriched solution to a temperature lower than that prevailing in the reabsorber during operation and means for effecting a heat interchange between the said rich absorption solution and the mixture of gaseous working medium and inert gas flowing from the absorber into the evaporator, comprising a heat interchange vessel located in the pipe connection through which the rich absorption solution is conducted into the evaporator and a second vessel traversed by the gas mixture flowing from the absorber to the evaporator and being enclosed by said heat interchange vessel, the admission and discharge pipes being connected to said two vessels in such a manner, that the gas mixture and the rich solution traverse the heat interchange device in counterflow to each other.

5. In an absorption refrigerating machine, consisting of a boiler, a reabsorber, an evaporator and an absorber, containing an absorption solution and a working medium partly gaseous and partly in a condensed fluid phase, and furthermore containing an inert gas admixed with the gaseous working medium in the evaporator and the absorber, connecting pipes between the absorber and the evaporator, which permit circulation of the mixture of working medium and inert gas, a connecting pipe between the reabsorber and the evaporator for conveying the absorption solution enriched in the reabsorber into the evaporator for the purpose of liberating gaseous working medium from the solution into the admixed inert gas, means for effecting a heat interchange between the said rich absorption solution and the mixture of gaseous working medium and inert gas flowing from the absorber into the evaporator, and means for effecting a heat interchange between the rich absorption liquid discharged from the reabsorber and the poor absorption solution flowing from the evaporator to the reabsorber, said means being located between said reabsorber and said first-mentioned heat interchange device whereby the rich absorption solution is cooled to a temperature lower than that prevailing in the reabsorber during operation.

6. In an absorption refrigerating system, an evaporator, an absorber, means for circulating an inert gas between the evaporator and the absorber, means for circulating an absorption liquid through the absorber, means for cooling a refrigerant to a temperature lower than that normally prevailing in the absorber during operation and for supplying the refrigerant, in a condensed fluid phase, to the evaporator, and means for causing the flow of heat from the inert gas to the cooled refrigerant as the gas passes from the absorber to the evaporator, to thereby cause the condensation of absorption liquid vapor carried from the absorber by the inert gas.

7. In an absorption refrigerating system, an evaporator, an absorber, means for circulating an inert gas between the evaporator and the absorber, means for cooling a refrigerant to a temperature lower than that normally prevailing in the absorber during operation, and means for supplying the cooled refrigerant to the evaporator while causing it to remove heat from inert gas flowing to the evaporator.

8. The method of removing undesirable vapors from a stream of inert gas flowing from the absorber to the evaporator of an absorption refrigerating apparatus, which method includes the steps of cooling a refrigerant to a temperature lower than that of the gas stream, bringing the cooled refrigerant into heat exchange relation with the gas stream to thereby cause a lowering of the temperature of the gas accompanied by condensation of the undesirable vapors, and then conducting said refrigerant to the evaporator.

9. In an absorption refrigerating system of the type in which an inert gas is circulated between an evaporator and an absorber and in which an absorption liquid, rich in refrigerant, is circulated through the evaporator, the method of removing undesirable vapors from the stream of inert gas flowing from the absorber to the evaporator, which includes the steps of causing a transfer of heat from the absorption liquid flowing to the evaporator, to the absorption liquid flowing from the evaporator, to thereby lower the temperature of the absorption liquid flowing to the evaporator to a considerable degree below the temperature of the stream of gas flowing to the evaporator, and then bringing the absorption liquid flowing to the evaporator and the inert gas flowing to the evaporator into heat exchange relation, to thereby cause a lowering of the temperature of the gas accompanied by condensation of the undesirable vapors.

In testimony whereof I affix my signature.

EDMUND ALTENKIRCH.